(12) United States Patent
Nilsson et al.

(10) Patent No.: US 6,986,545 B2
(45) Date of Patent: Jan. 17, 2006

(54) CAB SUSPENSION DEVICE

(75) Inventors: Ingemar Nilsson, Eskilstuna (SE);
Allan Ericsson, Västerås (SE); Jonny Lindblom, Eskilstuna (SE); Leif Norling, Eskilstuna (SE); Magnus Fornell, Eskilstuna (SE)

(73) Assignee: Volvo Wheel Loaders AB, Eskilstuna (SE)

( * ) Notice: Subject to any disclaimer, the term of this patent is extended or adjusted under 35 U.S.C. 154(b) by 0 days.

(21) Appl. No.: 10/707,763

(22) Filed: Jan. 9, 2004

(65) Prior Publication Data

US 2004/0201257 A1  Oct. 14, 2004

Related U.S. Application Data

(63) Continuation of application No. PCT/SE02/01229, filed on Jun. 20, 2002, now abandoned.

(30) Foreign Application Priority Data

Jul. 9, 2001 (SE) .................................... 0102466

(51) Int. Cl.
*B62D 33/10* (2006.01)
(52) U.S. Cl. .............................. 296/190.07; 180/89.12; 180/89.13
(58) Field of Classification Search .......... 296/190.07; 180/89.12, 89.13
See application file for complete search history.

(56) References Cited

U.S. PATENT DOCUMENTS

| 5,064,242 | A | | 11/1991 | Fujan et al. | |
| 6,017,073 | A | * | 1/2000 | Lindblom et al. | ..... 296/190.07 |
| 6,029,764 | A | * | 2/2000 | Schubert | ................ 296/190.07 |
| 6,408,970 | B1 | * | 6/2002 | Eng | ........................ 180/89.12 |
| 2002/0113463 | A1 | * | 8/2002 | Gross et al. | ........... 296/190.07 |

FOREIGN PATENT DOCUMENTS

| DE | 20010214 U1 | 1/2001 |
| EP | 0129363 A2 | 12/1984 |
| GB | 1557284 A | 12/1979 |
| WO | WO 9708038 A1 | 3/1997 |

* cited by examiner

*Primary Examiner*—Jason Morrow

(74) *Attorney, Agent, or Firm*—Novak Druce & Quigg LLP

(57) ABSTRACT

Method and device for suspending a cab (4) on a vehicle frame (3) using vertical orientation for both a first element (1) that absorbs shocks/vibrations from the vehicle frame (3) to the cab (4) and a second element (2) that acts as a load support between cab (4) and the vehicle frame (3) in the event of, for example, accident situations. The first and second elements (1, 2) are arranged on the device, which connects the cab (4) to the vehicle frame (3) by a firm connection between the first element (1) and the cab (4), or alternatively the vehicle frame (3).

34 Claims, 6 Drawing Sheets

CAB SUSPENSION DEVICE

CROSS REFERENCE TO RELATED APPLICATIONS

The present application is a continuation patent application of International Application No. PCT/SE02/01229 filed 20 Jun. 2002 now abandoned, which was published in English pursuant to Article 21(2) of the Patent Cooperation Treaty, and which claims priority to Swedish Application No. 0102466-0 filed 9 Jul. 2001. Both applications are expressly incorporated herein by reference in their entireties.

BACKGROUND OF INVENTION

1. Technical Field

The present invention relates to a device for suspension of a cab on a vehicle frame. The invention is intended in particular for construction machinery and contractor's machinery, the cab suspensions of which are subjected to relatively great stresses.

2. Background Art

Construction machinery/contractor's machinery such as, for example, wheel loaders and dumpers place considerable demands on the cab suspension construction. In order to make the working environment of the driver comfortable, the suspension must be capable of reducing/eliminating the relatively powerful vibrations and shocks which are otherwise transmitted from the vehicle frame to the cab. Moreover, for reasons of safety, the suspension must be sufficiently strong to retain the cab on the frame even if the vehicle should overturn. In this context, reference is frequently made to ROPS protection, where ROPS stands for Roll Over Protection Structure.

Conventionally, rubber has been included in the suspension construction in order to reduce the transmission of vibrations from frame to cab. In a traditional construction, the cab rests on a vibration element, usually taking the form of a "rubber collar" which is adapted for a through-type connecting means such as, for example, a bolt which connects the cab to the vehicle frame. The element of the suspension which serves for taking up load is usually arranged on the bolt under the vehicle frame. An example of a construction of this type is disclosed, for example, in U.S. Pat. No. 5,064,242. A disadvantage of this type of construction is that "rubber collars" do not meet current high requirements for vibration insulation/vibration damping.

In order to improve vibration-related characteristics, the utilization of what is known as "viscous mounts" or "hydro mounts" has become increasingly more common in suspension devices in recent years. Such vibration elements usually contain a viscous liquid, for example oil, which is used in order to reduce transmission of shocks and vibrations. A number of different alternatives have been proposed in functional solutions with the aim of combining the strength characteristics and vibration-damping characteristics of such suspension devices. An example is provided in EP 669484.

In most cases, the vibration-related and shock-related prevention characteristics are entirely adequate as far as elements of the "viscous mount" type are concerned, but the general problem is that strength characteristics are often limited. A known solution is to construct the vibration-damping element so that it meets prescribed strength requirements. The problem is then that the strength requirement has to be established once and for all because this requirement has a major influence on the manufacturing process. It is then difficult to adapt the construction to new circumstances. Another disadvantage of this solution is that the elements are relatively expensive.

Another solution is to make new attachment points and to mount one or more extra fastenings between the vehicle frame and the cab, parallel to (in front of, behind or at the side of) the vibration-damping element, in order to meet the strength requirements. The problem of this type of functional solution is that it requires considerable space and additional work for mounting and demounting, especially when the new attachment points require portions of the cab and/or the vehicle frame to be reinforced.

SUMMARY OF INVENTION

An object of the present invention is to provide a cab suspension arrangement/construction that provides good vibration-damping/insulating characteristics and, compared to known solutions, provides a simplified procedure for adaptation, mounting, demounting and exchange of the component elements for absorbing vibration and strength.

In at least one embodiment, the present invention takes the form of a device or arrangement for establishing the suspension of a cab on a vehicle frame. The arrangement comprises (includes, but is not limited to) a first element adapted mainly for reducing transmission of shocks/vibrations from the vehicle frame to the cab, and a second element adapted mainly for taking up load in the event of, for example, accident situations. The first and second elements are serially arranged in the general vertical direction with respect to the vehicle, and the device comprising means for connecting the cab and the vehicle frame, and the first and second elements are arranged on this connecting means. In one respect, the invention is characterized by the fact that the first element is connected firmly in the vehicle frame, or alternatively in the cab, and that the connecting means is connected firmly to the first element and the cab, or alternatively to the vehicle frame. Ultimately, in this embodiment, the connecting means constitutes a firm connection between the first element and the cab, or alternatively the vehicle frame.

The cab and the vehicle frame are thus firmly connected to one another via the first element and the connecting means, which first element can be mounted on either the vehicle frame or the cab. This construction makes it possible for a first element with good vibration-damping and vibration-insulating characteristics, for example a first element of the "viscous mount" type which is not adapted for a through-type connecting means, to be integrated in a suspension device comprising two different elements with different main functions, where both the first and the second element can, owing to the serial arrangement, act in the same attachment point between the cab and the vehicle frame. This in turn results in the device, according to the invention, being less bulky than conventional elements if arranged in parallel, and also affords the possibility of minimizing the number of attachment points between the cab and the vehicle frame. This construction also makes it possible to combine in the suspension device a relatively sophisticated first element with a relatively simple and robust second element.

The first and second elements are preferably arranged at a mutual spacing in the vertical direction of the including vehicle. In this way, space is provided for using, for example, other parts of the vehicle frame in the construction, and the possibility is also improved for bringing about a construction in which the two elements can act independently of one another, which allows greater flexibility in, for example, selection of the first and second elements.

The device suitably also comprises a part of the vehicle frame which serves for taking up load and is arranged serially in the vertical direction. The second element is preferably adapted to act against the part for taking up load when a certain spacing between the cab and the vehicle frame is reached. In this way, the force/load take-up of the first element can be limited to the forces/loads which arise under more moderate operating conditions, while the second element, the element for taking up load, can transmit all or some of the force/load to the part of the vehicle frame for taking up load in the event of, for example, accident situations in which the cab is forced by powerful forces in the direction away from the vehicle frame. That is to say, in a situation when the first element has been left a sufficiently long distance behind that such a spacing between the cab and the vehicle frame has been brought about that the second element is allowed to act against the part for taking up load. One advantage of this solution is that the first vibration-damping element can be constructed/selected with low strength requirements, which makes possible a simpler and more cost-effective overall construction.

The first and second elements preferably constitute separate detachable units. In this way, the possibility is provided of simply exchanging one element or the other mutually independently. In other words, it is possible to exchange a defective element or vary the type or make of one element simply without having to make any changes to the other element or adjacent parts of the cab or the vehicle frame.

The connecting means suitably comprises at least one elongate member, which member connects the first element and the cab, or alternatively the vehicle frame. The first and second elements are preferably arranged at a mutual spacing in the longitudinal direction of the elongate member.

In a further improvement of the invention, the elongate member is provided with threads with the same pitch in on the one hand the part which is intended to be screwed firmly into the first element and on the other hand the part which is intended to be screwed firmly into the cab, or alternatively the vehicle frame.

One advantage of the connecting means comprising an elongate member which connects the first element to the cab/vehicle frame is that the construction includes as few weaknesses and as little potential play as possible. By designing the elongate member with the same thread pitch at the upper end and the lower end, the connection can be adjusted (screwed) without the spacing between the first element and the cab/vehicle frame being changed, which is advantageous from the point of view of mounting. Among other things, a possibility is provided for mounting the invention from below the cab on occasions when it is difficult to reach from above. By, for example, first screwing the elongate member up into the cab with the aid of a nut stop and then mounting the first element in the vehicle frame, the connection can then be screwed down and adjusted in the first element. This may be particularly advantageous in the case of work with older machines which from the outset were not constructed for the type of suspension device according to the invention and in which accessibility for tightening is limited.

The present invention is therefore well-suited for being mounted on older machines which from the outset were not constructed for the type of suspension device according to the invention. Furthermore, a fundamental idea of the present invention is that the two elements are to be independent of one another. Firstly, this idea concerns the functioning, that is to say the element for taking up load is not to be loaded by vibrations and shocks during normal operation, and the vibration-absorbing element is not to be loaded by the forces which may arise in accident situations. In this way, a simple and cost-effective overall construction is made possible. Secondly, this idea concerns the physical design, that is to say one element is to be simply exchangeable without any changes having to be made to the other element. This makes the construction flexible and makes it possible to adapt the construction to different situations.

BRIEF DESCRIPTION OF DRAWINGS

The invention will be described in greater detail below with reference to the following figures, in which.

DETAILED DESCRIPTION

The figures below do not show a complete cab or vehicle frame, but these components are represented by small part-areas located close to the attachment points of the suspension device. Such a part-area may consist of, for example, part of a cab beam. The suspension of the cab normally comprises four suspension devices. The cab is positioned above the frame, and the vertical direction of the vehicle is essentially from the bottom up in the figures.

Figure 1:
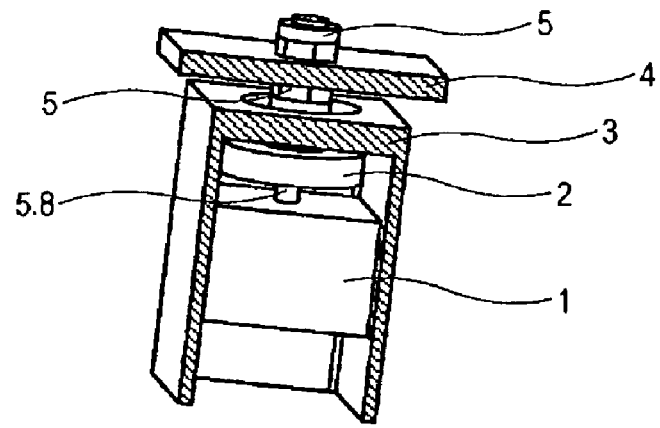
FIG. 1 shows a basic diagram of a perspective view of a first preferred embodiment of the invention.
Figure 2:
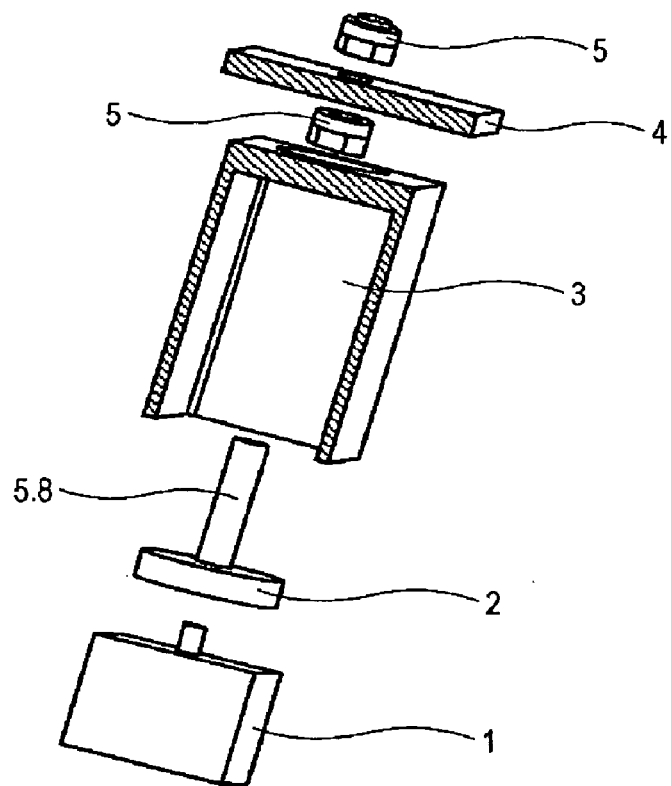
FIG. 2 shows an exploded diagram according to FIG. 1.
Figure 3:
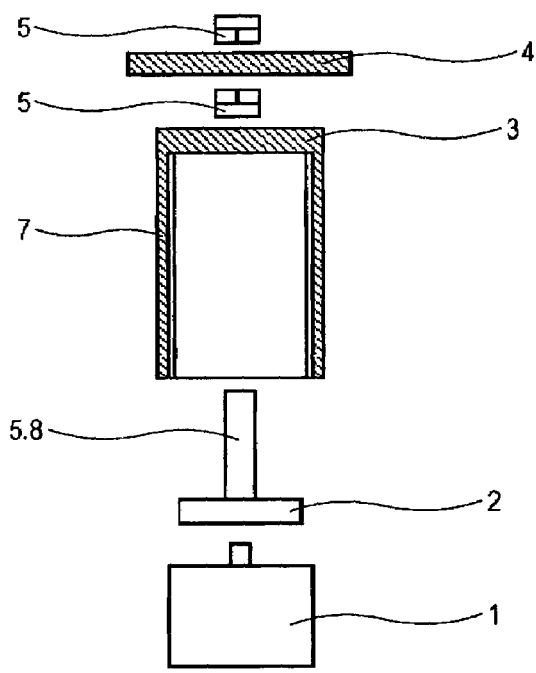
FIG. 3 shows another exploded diagram according to FIG. 1.

FIGS. 1, 2 and 3 show the principle of a first preferred embodiment of the invention. A first, vibration-damping element 1 is mounted firmly on a vehicle frame 3 by means of, for example, a screwed joint or a welded joint. With the aid of a connecting means 5, comprising an elongate member 8 and two nuts, the first element 1 is connected firmly to a cab 4, that is to say the first element 1 is connected firmly to the cab 4 via the connecting means 5. A second element 2, the element for taking up load, is arranged firmly on the elongate member 8 of the connecting means 5. The first and second elements 1, 2 are thus arranged serially in the vertical direction of the vehicle. Vibrations in the vehicle frame 3 are damped in the first element 1 and are transmitted only moderately to the connecting means 5 and thus the cab 4. The second element 2 vibrates with the connecting means 5 and, under more moderate operating conditions, will not come into any appreciable contact with the vehicle frame 3. In the event of a sufficiently forceful shock which causes the cab 4 and the connecting means 5 to move in the direction away from the vehicle frame 3, which may occur if, for example, the vehicle overturns, the second element 2 will act against a serially arranged part 7 (see FIG. 3) on the vehicle frame 3 for taking up load and in this connection retain the cab 4 in place. When the second element 2 begins to act against the part 7 on the vehicle frame 3 for taking up load, the load/force which the first element 1 has to take up is limited. The invention can be adapted so that the second element 2 also takes up loads/forces in the lateral direction(s) of the vehicle in a corresponding way to in the vertical direction of the vehicle.

The expression that a connection (or mounting etc.) is firm means in principle that the connection is intended for transmitting forces and thus requires some form of fastening such as a welded joint, screwed joint, riveted joint, adhesively bonded joint etc. The type of loose connection formed, for example, when a cab rests on a first element in the form of a "rubber collar" and exemplified in, for example, U.S. Pat. No. 5,064,242 is therefore not intended.

The top side provided of the second element 2 is suitably with, for example, rubber in order to obtain a softer action against the part 7 for taking up load. The sides connecting means 5 and/or the sides in the hole through the part 7 in the vehicle frame 5 for taking up load can also suitably be provided with the rubber in order to take up shocks and vibrations in the lateral direction(s) of the vehicle.

Figure 4:
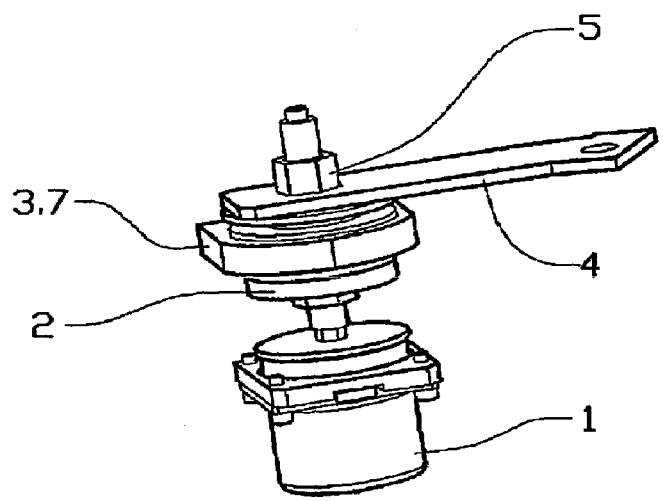
FIG. 4 shows a perspective view of a second preferred embodiment of the invention.
Figure 5:
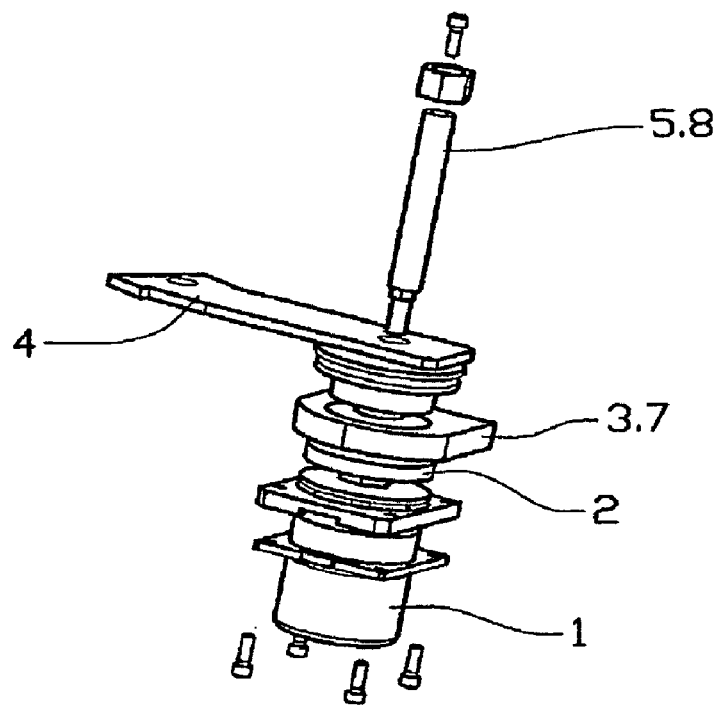
FIG. 5 shows an exploded view according to FIG. 4.
Figure 6:
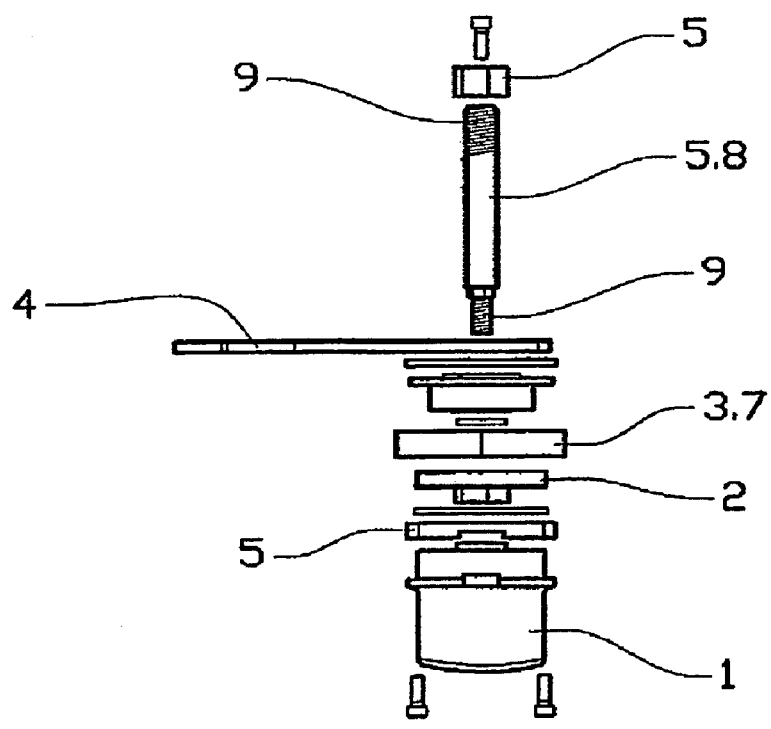
FIG. 6 shows another exploded diagram according to FIG. 4.
Figure 7:
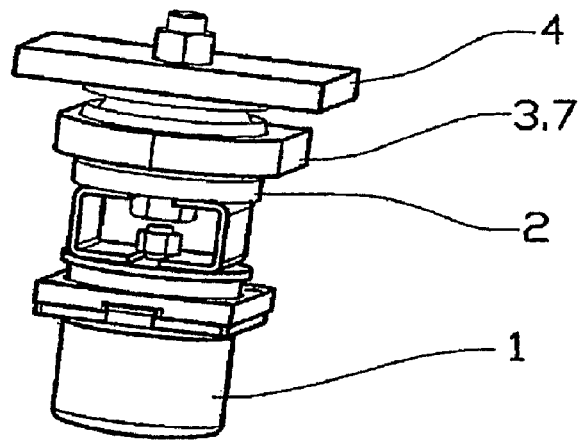
FIG. 7 shows a perspective view of a third preferred embodiment of the invention.
Figure 8:
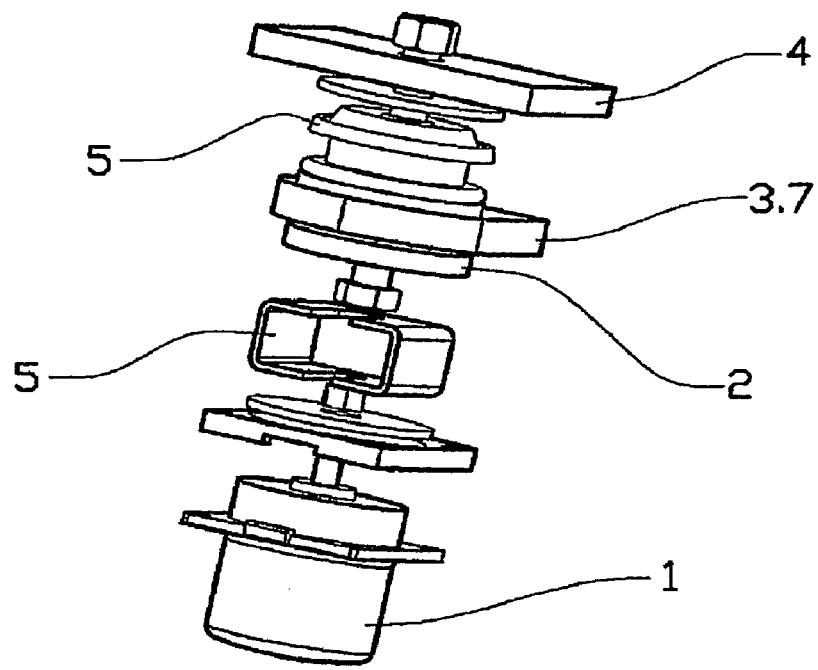
FIG. 8 shows an exploded diagram according to FIG. 7.
Figure 9:
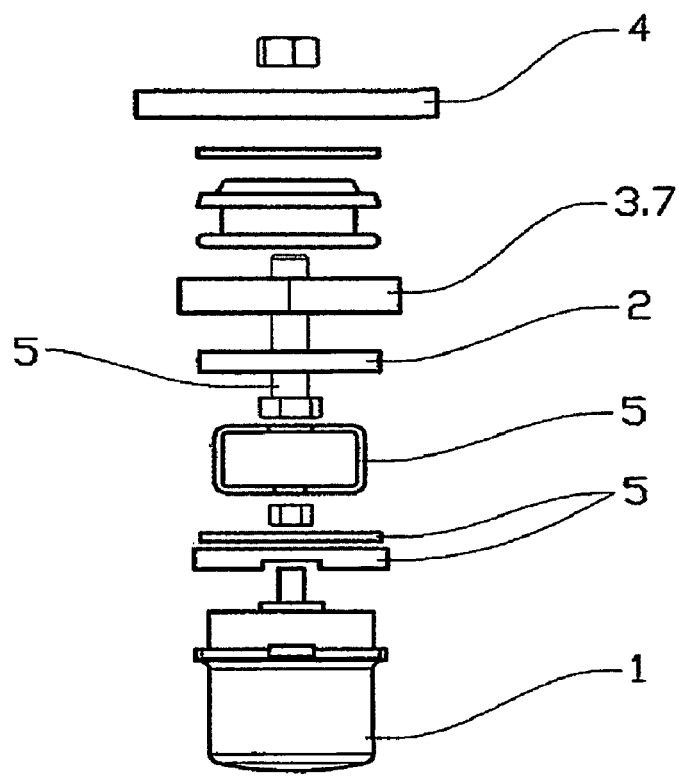
FIG. 9 shows another exploded diagram according to FIG. 7.
Figure 10:
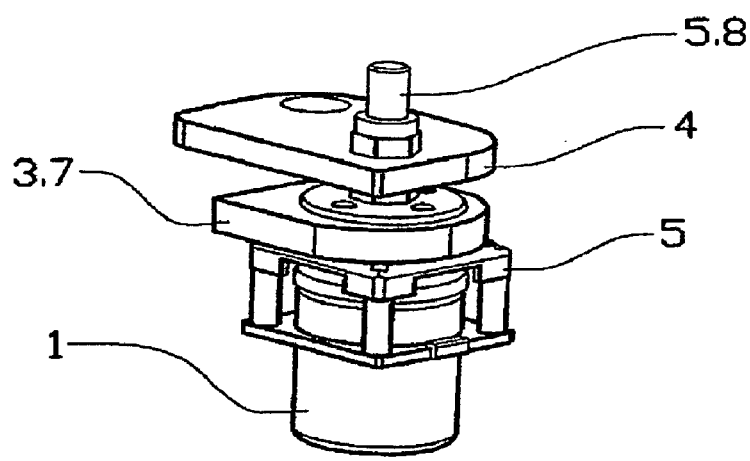
FIG. 10 shows a perspective view of a fourth preferred embodiment of the invention.
Figure 11:
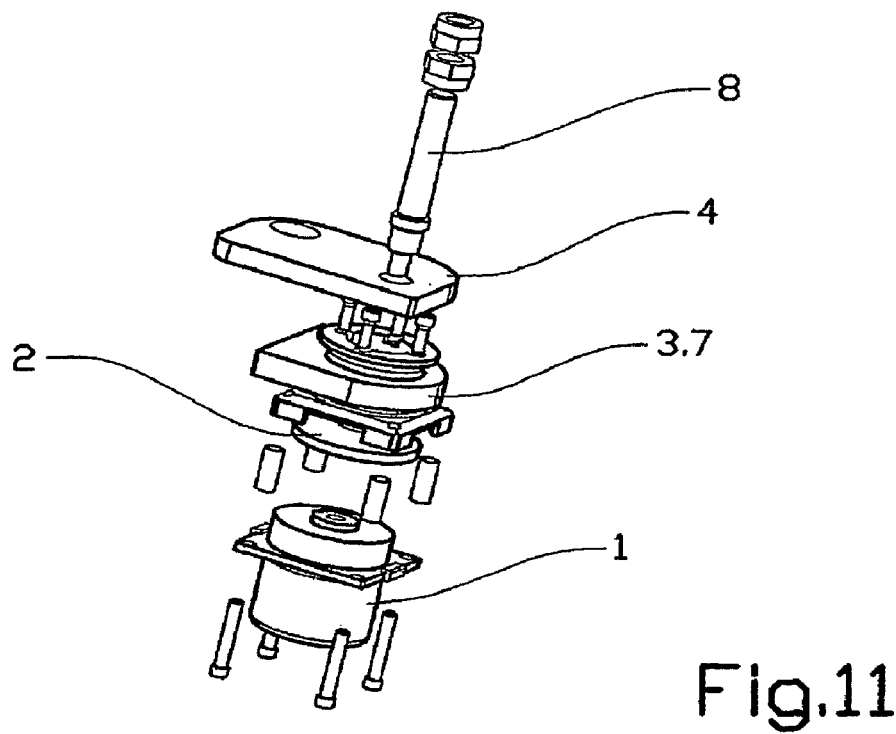
FIG. 11 shows an exploded diagram according to FIG. 10.
Figure 12:
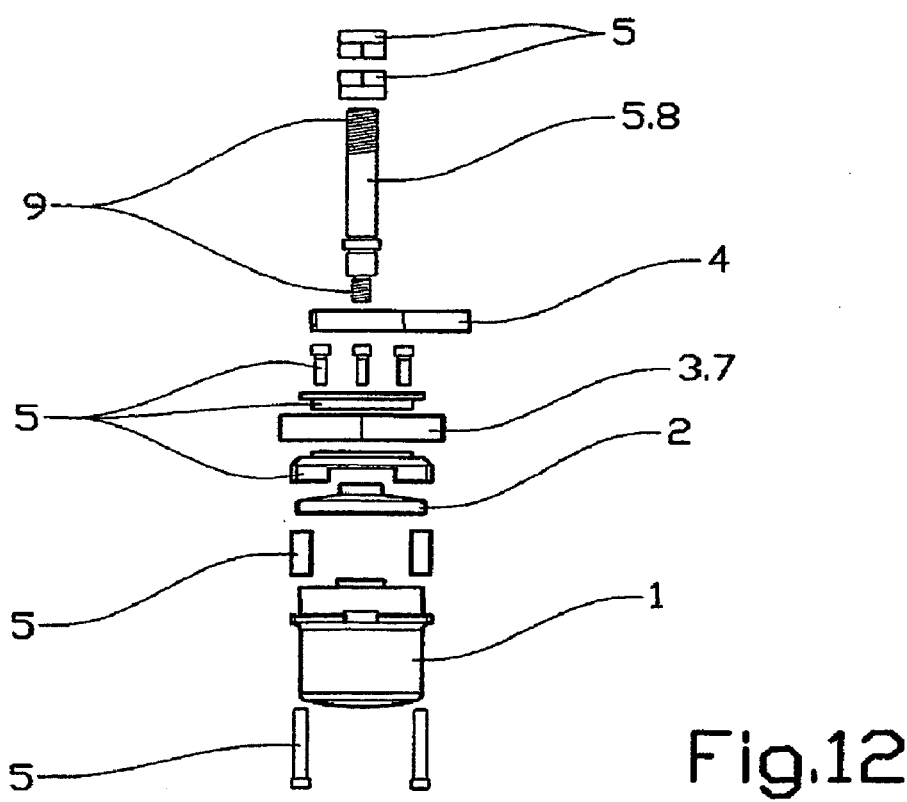
FIG. 12 shows another exploded diagram according to FIG. 10.

FIGS. 4, 5 and 6 show a second preferred embodiment of the invention. FIGS. 7, 8 and 9 show a third preferred embodiment of the invention. FIGS. 10, 11 and 12 show a fourth preferred embodiment of the invention. The three figures for each embodiment complement one another. The previous description of the first embodiment (FIGS. 1–3) can in the main also be applied to these three embodiments as, in principle, they have the same construction. What distinguishes the different embodiments is chiefly the design of the connecting means 5 which, as can be seen in FIGS. 4–12, consists of a large number of different components such as bolts, nuts and washers.

The main purpose of the first element 1 is to reduce/eliminate transmission of shocks and/or vibrations from the vehicle frame 3 to the cab 4, while the main purpose of the second element 2 is to take up loads in the event of, for example, accident situations and therefore to function as ROPS protection. Reducing/eliminating transmission of shocks and vibrations can comprise both insulation and damping, for which reason the first element can have both insulating and damping characteristics. Expressions such as vibration damping, vibration damper, vibration element etc. mean the function or the element which relates to the main purpose of the first element 1.

The first element 1 is preferably of the "viscous mount" type with both vibration-insulating and damping characteristics. This type normally comprises a rubber spring and a device in which work losses are generated in a suitable manner. This device preferably contains a liquid such as, for example, silicone oil or glycol, which liquid is, for example, forced to pass through throttlings. Alternatively, use can be made of a construction which utilizes the work losses in an elastic material such as, for example, rubber. One reason why such "viscous mounts" have better vibration-damping characteristics than "rubber collars" is that the former not only vibration-insulate at high vibration frequencies but can also be designed so that they damp resonant vibrations brought about by, for example, shock sequences. In terms of construction, "rubber collars" and "viscous mounts" differ considerably because they have to be arranged in different ways.

It is common to the different embodiments that the second element 2 is arranged firmly on the connecting means 5 in a position between the first element 1 and the vehicle frame 3 (see, for example, FIGS. 1, 4, 7 and 11). The second element 2 consists of a disk-shaped or plate-shaped member. The second element 2 can of course be designed in a different way; for example, a number of disks or plates can be included.

FIGS. 6 and 12 also show the threads 9 of the elongate member 8, with the same pitch in on the one hand the part which is intended to be screwed firmly into the first element 1 and on the other hand the part which is intended to be screwed firmly into the cab 4, or alternatively the vehicle frame 3.

In the event of difficulties in reaching to work from the cab, it is possible in principle to block up the cab 4 in the correct position, and then, in a nut with a nut stop on the top side of the beam of the cab 4, to screw the elongate member 8 (see FIGS. 3–6) up into the cab 4 as far as necessary in order for it to be possible to mount the first element 1 on the vehicle frame 3, the rest of the connecting means 5 and also the second element 2. Owing to the fact that the pitch of the thread 9 is the same at both ends, the elongate member 8 can then be screwed down into the first element 1 without the spacing between the cab 4 and the first element 1 being changed. Vertical adjustment of various suspension devices of the cab 4, for example, is then simple to perform.

The invention is not limited to the illustrative embodiments described above, but a number of modifications are conceivable within the scope of the patent claims below. For example, all the embodiments show a construction in which the first element 1 is connected firmly on the vehicle frame 3 and the connecting means 5 constitutes a firm connection between the first element 1 and the cab 4. However, it is entirely possible instead to connect the first element 1 on the cab and to have the connecting means 5 constitute a firm connection between the first element 1 and the cab 4. However, it is entirely possible instead to connect the first element 1 on the cab and to have the connecting means 5 constitute a firm connection between the first element 1 and the vehicle frame 3. In this alternative case, the second element 2 must of course be arranged firmly on the connecting means 5 in a position between the first element 1 and the cab 4, and then act against a part on the cab 4 for taking up load, in order to have an effect.

The invention claimed is:

1. A device for suspension of a cab (4) on a frame (3) of a vehicle, comprising a connector (5) having a firm connection to the cab (4) or alternatively to the frame (3) and a first element (1) configured to reduce transmission of shocks/vibrations from the vehicle frame (3) to the cab (4), said first element being connected firmly in one of the vehicle frame (3) and the cab (4) and a second element (2) configured to take up load in roll-over accident situations, said first and second elements (1, 2) being arranged serially on said connector in a vertical direction of the vehicle.

2. The device as claimed in claim 1, wherein said first and second elements (1, 2) are arranged at a mutual spacing in said vertical direction.

3. The device as claimed in claim 1, further comprising a part (7) of the vehicle frame (3) which serves for taking up load and is arranged serially in said vertical direction.

4. The device as claimed in claim 3, wherein said second element (2) is adapted to act against said part (7) for taking up load when a certain spacing between the cab (4) and the vehicle frame (3) is reached.

5. The device as claimed in claim 1, wherein said first and second elements (1, 2) constitute separate detachable units.

6. The device as claimed in claim 1, wherein said connecting means (5) comprises at least one elongate member (8), which member (8) connects said first element (1) and the cab (4), or alternatively the vehicle frame (3).

7. The device as claimed in claim 6, wherein said first and second elements (1, 2) are arranged at a mutual spacing in the longitudinal direction of said elongate member (8).

8. The device as claimed in claim 6, wherein said elongate member (8) is provided with threads (9) with the same pitch in on the one hand the part which is intended to be screwed firmly into said first element (1) and on the other part which is intended to be screwed firmly to the cab (4), or alternatively the vehicle frame (3).

9. The device as claimed in claim 1, wherein the first element (1) is liquid-filled.

10. The device as claimed in claim 1, wherein the second element (2) is arranged firmly on said connecting means (5) in a position between the first clement (1) and the vehicle frame (3) in a case where said first element (1) is connected firmly in the vehicle frame (3), or alternatively in a position between the first element (1) and the cab (4) in a case where said first element (1) is connected firmly in the cab (4).

11. The device as claimed in claim 1, wherein the second element (2) is adapted to take up forces in the lateral direction of the vehicle.

12. The device as claimed in claim 1, wherein the second element (2) consists of one or more disk-shaped or plate-shaped member(s).

13. The device as claimed in claim 1, wherein the device is intended for use with a machine selected from the group consisting of a dumper and a wheel loader.

14. A device for suspension of a cab (4) on a frame (3) of a vehicle, comprising a connector (5) having a firm connection to the cab (4) or alternatively to the frame (3) and a first element (1) adapted mainly for reducing transmission of shocks/vibrations from the vehicle frame (3) to the cab (4), said first element is connected firmly in the vehicle frame (3) or alternatively in the cab (4) and a second element (2) adapted to act against a part (7) of the frame (3) for taking up load in the event of, roll-over of the vehicle when a certain spacing is reached between the cab (4) and the vehicle frame (3), said first and second elements (1, 2) being arranged serially on said connector in vertical direction of the vehicle.

15. A device for suspension of a cab (4) on a frame (3) of a vehicle, comprising a connector (5) having at least one elongate member (8) providing firm connection of a first element (1) to the cab (4), or alternatively to the frame (3), said first element (1) adapted mainly for reducing transmission of shocks/vibrations from the frame (3) to the cab (4), and a second element (2) adapted mainly for taking up load in the event of, roll-over of the vehicle, said first and second elements (1, 2) being arranged serially on said connector in vertical direction of the vehicle, said elongate member (8) having a first portion and a second portion each with threads (9) of the same pitch wherein said first portion is intended to be screwed firmly into said first element (1) and said second portion is intended to be screwed firmly into the cab (4), or alternatively the frame (3).

16. A device for suspension of a cab (4) on a frame (3) of a vehicle, comprising a connector (5) having a firm connection to the cab (4) or alternatively to the frame (3) and a first element (1) adapted mainly for reducing transmission of shocks/vibrations from the vehicle frame (3) to the cab (4), said first element is connected firmly in the vehicle frame (3) or alternatively in the cab (4) and a second element (2) adapted mainly for taking up toad in the event of, roll-over of the vehicle, said second element (2) is arranged firmly on said connector (5) in a position between said first element (1) and the frame (3) when said first element (1) is connected firmly in the frame (3), or alternatively in a position between the first element (1) and the cab (4) when said first element (1) is connected firmly in the cab (4), said first and second elements (1, 2) being arranged serially on said connector in vertical direction of the vehicle.

17. A device for suspending a cab (4) on a frame portion (3) of a vehicle comprising:
 a connector unit (5) having a firm connection to the cab (4);
 a first element (1) mounted on the connector for firm attachment of the first element (1) to the frame portion (3) to limit vibrations transmitted from the frame portion (3) to the cab (4); and
 a second element (2) mounted on the connector between the cab (4) and the first element to reduce cab instability leading to roll-over of the vehicle.

18. The device of claim 17, wherein the connector unit is an elongate connector having first and second ends.

19. The device of claim 18, wherein the first element (1) is mounted firmly at the first end of the elongate connector and the second element (2) is mounted adjacent to the second end of the elongate connector.

20. A device for suspension of a cab (4) on a vehicle frame (3), comprising a first element (1) configured to reduce transmission of normal operating shocks/vibrations from the vehicle frame (3) to the cab (4), and a second element (2) configured to take up load in roll-over situations, said first second elements (1, 2) being arranged serially in vertical direction of the vehicle, and the device comprising means (5) for connecting the cab (4) and the vehicle frame (3), said first and second elements (1, 2) being arranged on said connecting means (5), said first element (1) is connected firmly in the vehicle frame (3), or alternatively in the cab (4), and in that said connecting means (5) is connected firmly to said first element (1) and also to the cab (4), or alternatively to the vehicle frame (3), said connecting means (5) constituting the firm connection between said first element (1) and the cab (4), or alternatively the vehicle frame (3).

21. A device for suspension of a cab (4) on a vehicle frame (3), comprising a first element (1) adapted mainly for reducing transmission of shocks/vibrations from the vehicle frame (3) to the cab (4), and a second element (2) adapted mainly for taking up load in the event of, roll-over of the vehicle, said first second elements (1, 2) being arranged serially in vertical direction of the vehicle, and the device comprising means (5) for connecting the cab (4) and the vehicle frame (3), said first and second elements (1, 2) being arranged on said connecting means (5), said first element (1) is connected firmly in the vehicle frame (3), or alternatively in the cab (4), and in that said connecting means (5) is connected firmly to said first element (1) and also to the cab (4), or alternatively to the vehicle frame (3), said connecting means (5) constituting the firm connection between said first element (1) and the cab (4), or alternatively the vehicle frame (3), a part (7) of the vehicle frame (3) which serves for taking up load and is arranged serially in said vertical direction, said second element (2) is adapted to act against said part (7) for taking up load when a certain spacing between the cab (4) and the vehicle frame (3) is reached.

22. A device for suspension of a cab (4) on a vehicle frame (3), comprising a first element (1) adapted mainly for reducing transmission of shocks/vibrations from the vehicle frame (3) to the cab (4), and a second element (2) adapted mainly for taking up load in the event of, roll-over of the vehicle, said first second elements (1, 2) being arranged serially in vertical direction of the vehicle, and the device comprising means (5) for connecting the cab (4) and the vehicle frame (3), said first and second elements (1, 2) being arranged on said connecting means (5), said first element (1) is connected firmly in the vehicle frame (3), or alternatively in the cab (4), and in that said connecting means (5) is connected firmly to said first element (1) and also to the cab (4), or alternatively to the vehicle frame (3), said connecting means (5) constituting the firm connection between said first element (1) and the cab (4), or alternatively the vehicle frame (3), said connecting means (5) comprises at least one elongate member (8), which member (8) connects said first element (1) and the cab (4), or alternatively the vehicle frame (3), said elongate member (8) is provided with threads (9) with the same pitch in on the one hand the part which is intended to be screwed firmly into said first element (1) and on the other part which is intended to be screwed firmly to the cab (4), or alternatively the vehicle frame (3).

23. A device for suspension of a cab (4) on a vehicle frame (3), comprising a first element (1) adapted mainly for reducing transmission of shocks/vibrations from the vehicle frame (3) to the cab (4), and a second element (2) adapted mainly for taking up load in the event of, roll-over of the vehicle, said first second elements (1, 2) being arranged serially in vertical direction of the vehicle, and the device comprising means (5) for connecting the cab (4) and the vehicle frame (3), said first and second elements (1, 2) being arranged on said connecting means (5), said first element (1) is connected firmly in the vehicle frame (3), or alternatively in the cab (4), and in that said connecting means (5) is connected firmly to said first element (1) and also to the cab (4), or alternatively to the vehicle frame (3), said connecting means (5) constituting the firm connection between said first element (1) and the cab (4), or alternatively the vehicle frame (3), the second element (2) is arranged firmly on said connecting means (5) in a position between the first element (1) and the vehicle frame (3) in a case where said first element (1) is connected firmly in the vehicle frame (3), or alternatively in a position between the first element (1) and the cab (4) in a case where said first element (1) is connected firmly in the cab (4).

24. The device as claimed in any one of claims 20–23, wherein said first and second elements (1,2) are arranged at a mutual spacing in said vertical direction.

25. The device as claimed in any one of claims 20–23, further comprising a part (7) of the vehicle frame (3) which serves for taking up load and is arranged serially in said vertical direction.

26. The device as claimed in claim 22, wherein said second element (2) is adapted to act against said part (7) for taking up load when a certain spacing between the cab (4) and the vehicle frame (3) is reached.

27. The device as claimed in any one of claims 20–23, wherein said first and second elements (1, 2) constitute separate detachable units.

28. The device as claimed in any one of claims 20–21 and 23, wherein said connecting means (5) comprises at least one elongate member (8), which member (8) connects said first element (1) and the cab (4), or alternatively the vehicle frame (3).

29. The device as claimed in claim 28, wherein said first and second elements (1, 2) are arranged at a mutual spacing in the longitudinal direction of said elongate member (8).

30. The device as claimed in any one of claims 20–23, wherein the first element (1) is liquid-filled.

31. The device as claimed in any one of claims 20–22, wherein the second element (2) is arranged firmly on said connecting means (5) in a position between the first element (1) and the vehicle frame (3) in a case where said first element (1) is connected firmly in the vehicle frame (3), or alternatively in a position between the first element (1) and the cab (4) in a case where said first element (1) is connected firmly in the cab (4).

32. The device as claimed in any one of claims 20–23, wherein the second element (2) is adapted to take up forces in the lateral direction of the vehicle.

33. The device as claimed in any one of claims 20–23, wherein the second element (2) consists of one or more disk-shaped or plate-shaped member(s).

34. The device as claimed in any one of claims 20–23, wherein the device is configured as a component for incorporation upon a dumper or a wheel loader.

* * * * *